US010351342B2

(12) United States Patent
Rauwerdink et al.

(10) Patent No.: US 10,351,342 B2
(45) Date of Patent: Jul. 16, 2019

(54) STORAGE RACK

(71) Applicant: NEDCON B.V., Doetinchem (NL)

(72) Inventors: Edwin Rauwerdink, Winterswijk (NL); Mark Assink, Ruurlo (NL); Jan Willem Frederiks, Doetinchem (NL)

(73) Assignee: NEDCON B.V., Doetinchem (NL)

(*) Notice: Subject to any disclaimer, the term of this patent is extended or adjusted under 35 U.S.C. 154(b) by 0 days.

(21) Appl. No.: 15/520,866

(22) PCT Filed: Oct. 1, 2015

(86) PCT No.: PCT/EP2015/072724
§ 371 (c)(1),
(2) Date: Apr. 21, 2017

(87) PCT Pub. No.: WO2016/062518
PCT Pub. Date: Apr. 28, 2016

(65) Prior Publication Data
US 2017/0313511 A1 Nov. 2, 2017

(30) Foreign Application Priority Data
Oct. 22, 2014 (DE) .................... 20 2014 105 051 U

(51) Int. Cl.
*B65G 1/02* (2006.01)
*A47B 47/02* (2006.01)

(52) U.S. Cl.
CPC .............. *B65G 1/02* (2013.01); *A47B 47/027* (2013.01); *B65G 2207/40* (2013.01)

(58) Field of Classification Search
CPC ... B65G 1/02; B65G 1/00; B65G 1/14; B65G 2207/40; A47B 47/027; A47B 96/00
See application file for complete search history.

(56) References Cited

U.S. PATENT DOCUMENTS 3,659,723 A * 5/1972 Konstant .................. B65G 1/02
108/108
4,666,131 A * 5/1987 Kettelkamp, Sr. ..........................
E04G 21/3214
256/59

(Continued)

FOREIGN PATENT DOCUMENTS

DE 30 21 090 12/1981
DE 203 03 178 6/2003

*Primary Examiner* — Patrick D Hawn
(74) *Attorney, Agent, or Firm* — Gudrun E. Huckett

(57) ABSTRACT

The invention relates to a storage rack for accommodating cuboid-shaped piece goods such as loaded standard pallets or standard containers, comprising front and rear vertical support elements (1, 4), storage lanes extending over the rack depth, which are provided with at least two horizontal profiled supporting elements (10), which are arranged parallel to each other, in order to provide supports (11) for the piece goods, and stop elements (7) at the ends of the storage lanes facing away from the placement-into-storage and removal-from-storage ends, wherein the stop elements (7) are located at a level above the level of the supports (11). In order to reduce the risk that the rack can be damaged when piece goods are placed into storage too hard in the direction of the rack depth in the case of a storage rack for accommodating cuboid-shaped piece goods such as loaded standard pallets, by means of economical measures that are simple in respect of assembly, the stop elements (7) are fastened to the rear support elements (4) and/or the profiled supporting elements (10) by means of connecting elements (8) that are designed to be deformable in a yielding manner in the longitudinal direction of the storage lanes.

15 Claims, 5 Drawing Sheets

(56) References Cited

U.S. PATENT DOCUMENTS

| | | | | |
|---|---|---|---|---|
| 4,955,490 A * | 9/1990 | Schafer | A47B 57/581 | 211/187 |
| 4,981,225 A * | 1/1991 | Cole | B65G 1/02 | 211/180 |
| 5,170,829 A * | 12/1992 | Duncan | B65G 1/02 | 160/194 |
| 5,377,851 A * | 1/1995 | Asano | A47B 47/022 | 211/191 |
| 5,573,125 A * | 11/1996 | Denny | A47B 96/00 | 160/84.01 |
| 5,984,121 A * | 11/1999 | Cole | B65G 1/02 | 211/183 |
| 6,173,846 B1 | 1/2001 | Anderson | | |
| 6,585,122 B2 * | 7/2003 | Calleja | A47F 5/01 | 211/180 |
| 6,609,621 B2 * | 8/2003 | Denny | A47B 47/021 | 211/180 |
| 6,619,490 B2 * | 9/2003 | Calleja | A47F 5/01 | 211/180 |
| 6,698,604 B2 * | 3/2004 | Denny | A47B 47/021 | 182/138 |
| 6,722,512 B2 * | 4/2004 | Scully | A47F 5/13 | 211/175 |
| 6,758,448 B1 * | 7/2004 | Williams | A47B 96/02 | 248/125.1 |
| 6,776,298 B2 * | 8/2004 | Courtwright | B65G 1/026 | 211/183 |
| 6,837,388 B2 * | 1/2005 | Calleja | A47F 5/01 | 182/138 |
| 7,014,053 B2 * | 3/2006 | Calleja | A47F 5/01 | 182/138 |
| 7,191,907 B2 * | 3/2007 | Conway | A47B 47/027 | 182/138 |
| 7,832,572 B2 * | 11/2010 | Wyatt | A47B 47/027 | 211/181.1 |
| 8,267,263 B2 * | 9/2012 | Hamby | B65D 19/40 | 108/57.33 |
| 9,266,673 B2 * | 2/2016 | Hamby | B65D 19/40 | |
| 9,290,322 B2 * | 3/2016 | Heijmink | A47B 47/0058 | |
| 9,296,559 B2 * | 3/2016 | Nomura | B65G 1/02 | |
| 9,545,150 B2 * | 1/2017 | Keck | B65G 1/02 | |
| 9,604,783 B2 * | 3/2017 | McAuliffe | B65G 1/14 | |
| 9,604,784 B2 * | 3/2017 | McAuliffe | B65G 1/14 | |
| 9,770,122 B2 * | 9/2017 | Gonzalez | A47B 96/028 | |
| 2002/0144966 A1 * | 10/2002 | Calleja | A47F 5/01 | 211/183 |
| 2002/0148799 A1 * | 10/2002 | Denny | A47B 47/021 | 211/186 |
| 2005/0000928 A1 * | 1/2005 | Calleja | B65G 1/00 | 211/183 |
| 2009/0084746 A1 * | 4/2009 | Rioux | A47B 47/021 | 211/183 |
| 2011/0309044 A1 * | 12/2011 | Morrow | A47F 5/005 | 211/59.2 |
| 2012/0261366 A1 * | 10/2012 | Nagy | A47B 96/00 | 211/59.2 |
| 2014/0110547 A1 * | 4/2014 | Consaul | F16M 13/00 | 248/231.9 |
| 2015/0014262 A1 * | 1/2015 | McAuliffe | B65G 1/14 | 211/71.01 |
| 2015/0060381 A1 * | 3/2015 | Consaul | B65G 1/02 | 211/183 |
| 2015/0068997 A1 * | 3/2015 | Nomura | B65G 1/02 | 211/134 |
| 2015/0101998 A1 * | 4/2015 | Keck | B65G 1/02 | 211/49.1 |
| 2015/0351543 A1 * | 12/2015 | Nagy | A47B 96/00 | 211/134 |
| 2016/0120312 A1 * | 5/2016 | McAuliffe | B65G 1/02 | 211/183 |
| 2016/0120338 A1 * | 5/2016 | Nagy | A47B 96/00 | 211/153 |
| 2016/0362250 A1 * | 12/2016 | Duppong | B65G 1/02 | |
| 2017/0313511 A1 * | 11/2017 | Rauwerdink | B65G 1/02 | |

* cited by examiner

STORAGE RACK

BACKGROUND OF THE INVENTION

The invention relates to a storage rack for accommodating cuboid-shaped piece goods, such as loaded standard pallets or standard containers, comprising front and rear vertical support elements, storage lanes extending over the rack depth, which are provided with at least two horizontal profiled supporting elements which are arranged parallel to one another in order to provide supports for the piece goods, and stop elements at the ends of the storage lanes facing away from the placement-into-storage and removal-from storage ends, wherein the stop elements are located at a level above the level of the supports.

A storage rack of this kind is frequently the smallest unit in large-scale high-bay storage systems, as are used for example by mail order companies. The placement-into-storage and removal-from-storage of the generally cuboid-shaped piece goods takes place from a cross lane by means of fork-lift trucks or by using special rack servicing appliances. The storage racks which are preferably arranged on each side of the cross lane have storage lanes which are open towards the cross lane and in which the goods or package units are arranged. Structural components of the storage racks are vertical support elements which are connected to one another by transversely arranged crossbeams. Two horizontal supports on which the piece goods can be set down belong to each storage lane. These supports are normally located on two profiled supporting elements which are arranged parallel to one another. The profiled supporting elements extend either in the direction of the rack depth, or else the front and rear crossbeams themselves serve as profiled supporting elements. The latter is conventional in the case of pallet storage racks wherein the respective pallet is supported in the region of its front edge, in the placement-into-storage direction, on the rear crossbeam and in the region of its rear edge, in the placement-into-storage direction, on the front crossbeam.

Although the placement of new piece goods into storage is often carried out automatically and with corresponding positioning accuracy it cannot always be ruled out that piece goods are placed too far in, seen from the cross lane. Placing goods too far in is disadvantageous from the point of view of later removal from storage if the rack servicing appliance does not pick up the piece good at the anticipated position, but slightly in front of same. A lack of positioning accuracy is very problematic in the case of pallet racks in which the pallets loaded with goods only rest on the front and rear crossbeams since if the goods are then placed too far in there may be insufficient support for the pallet leading to the risk that the pallet may fall.

In order to prevent the piece goods from being placed too far into storage, the storage racks are provided at their end facing away from the cross lane with stable stop elements which are anchored rigidly on the rack and serve as stops. The stop elements are located at a level above the level of the supports and thus restrict the possible placement-into-storage depth in the storage lane. They thus have a stable configuration and are fixed so that placing the piece good too far in, in relation to the rack depth, is practically ruled out.

The presence of practically rigid stop elements has the result that in cases where the goods are placed clearly too forcefully and more particularly in an uncontrolled manner in the direction of the rack depth too powerfully and more particularly unbraked horizontal forces may act on the storage rack so that damage to the rack and more particularly its supporting, components cannot be ruled out.

The object of the invention is to reduce in the case of a storage rack for accommodating cuboid-shaped piece goods such as e.g. loaded standard pallets through technically simple and commercially viable assembly means the risk that damage may occur to the rack when the piece goods are placed too hard in the direction of the rack depth.

SUMMARY OF THE INVENTION

It is therefore proposed in the case of a storage rack having the features already mentioned according to the invention that the stop elements are attached to the rear support elements and/or to the profiled supporting elements by way of connecting elements which are designed to be deformable in a yielding manner in the longitudinal direction of the storage lanes.

Since the stop elements do not act rigidly but are connected to the support elements and/or to the profiled supporting elements of the storage rack via damping elements which are deformable and yield in the longitudinal direction of the storage lane, this reduces the risk that in the case of placing the piece goods too forcefully in the direction of the rack depth damage may occur to the rack and to its supporting components through strong impact forces, possibly leading to deformation and thus weakening of the support elements which are particularly important for the statics of the rack. The damping elements are thus arranged and configured so that through deformation and stretching they absorb the forces which could normally lead to damage to the rack.

The deformation of the damping and connecting elements is preferably not reversible but is of a plastic nature. It thus results in a permanent deformation. The elements thus deformed must therefore then be replaced by new elements which still have their complete deformability.

Advantageous configurations of the storage rack are provided in the dependent claims.

Advantageous for a commercially viable manufacture of the connecting, element is a configuration in which the connecting element is a shaped sheet metal part with an integrally formed first fastening region for rigid connection with the support element or profiled supporting element, second fastening region for rigid connection with the stop element, deformable region between the two fastening regions wherein the deformable region comprises at least one section which extends transversely or inclined to the placement-into-storage or removal-from-storage direction.

With regard to the first fastening region it is proposed that this is arranged vertically for its fastening on the support element of the storage rack. This first fastening region is preferably fastened to the rear side of the rear support element.

With regard to the second fastening region it is proposed that this is arranged substantially horizontally, and preferably is fastened to the upper side or underside of the stop element. This configuration enables a particularly good permanent force transmission between the flexibly deformable connecting element and the comparatively rigid stop element. If these two parts are then screwed to one another, the initially horizontal impact forces are transferred both through the friction connection which is achieved as a result of the screw fitting, and also through the form-fitting connection between the screw and the openings in the stop element and in the connecting element which are provided for passing through the screw. This thereby reduces the risk that over the course of time the connection between the stop element and the connecting element may become loose due to impacts.

According to a further configuration the second fastening region consists of two fastening zones arranged horizontally side by side wherein a first stop element is fastened in the first fastening zone and a second, i.e. different, stop element is fastened in the second fastening zone, e.g. by means of a screw fitting. It is hereby advantageous that two stop elements can equally be fastened on one and the same connecting and damping element, whereby the number of parts required overall can be reduced. It is furthermore advantageous with this configuration that there may only be relatively small interactions. For indeed two stop elements are fastened on one and the same common connecting element, but in different fastening zones and at a distance from one another. In the event of hard knocks the adjacent stop elements can therefore carry out relative movements to one another without too much reciprocal influence. This reduces the mechanical stress on the parts, and extends their service life.

With one configuration of the connecting element it is proposed that the deformable region arranged between the two fastening regions is comprised of bending sections with mutually opposing bending profiles. Advantageously here a first bending section is formed as a downward opening dish or channel, and a following second bending section is formed as an upward opening dish or channel. A configuration of this kind can be produced easily and cost-effectively by simply bending and deforming the shaped sheet metal part, and enables a good stretching action in the event of powerful knocks on the stop element, with at the same time excellent damping behaviour through the permanent deformation.

With the aim of providing a technically favorable assembly it is proposed that the first fastening region is screwed or riveted to the rear support element, and that the section extending transversely or inclined to the placement-into-storage and removal-from-storage direction is provided in an extension with an assembly opening for the screw or rivet connection. The assembly opening can be produced very easily by hole-punching the shaped sheet metal part and making it easier to screw or rivet the connecting, and damping element to the rear side of the rack.

According to a further configuration a bracket plate is formed integrally on the connecting element with its free end opposite a vertically arranged surface on the rear support element or on the profiled supporting element. The bracket plate provides an additional support whereby vertical oscillation or vibration of the stop element is suppressed. The free end of the bracket plate can then be supported either directly against the vertically arranged surface, or the free end of the bracket plate lying opposite the vertically arranged surface with only a slight spacing.

With a further configuration it is proposed that the rear support is formed as a profiled member, that the vertically arranged surface is an indentation extending in the profile longitudinal direction in the rear side of the profiled member, and that the profiled member has on each side of the indentation flat surface regions against which the first fastening region of the connecting element is fastened.

With further configurations it is proposed that the free end of the bracket plate is arranged underneath the fastening region, and that the bracket plate is a stamped section of the shaped sheet metal part which constitutes the connecting element.

BRIEF DESCRIPTION OF THE DRAWINGS

Further advantages and details are apparent from the following description of two exemplary embodiments, wherein reference is made to the drawings. In the drawings

DESCRIPTION OF PREFERRED EMBODIMENTS

Figure 1:
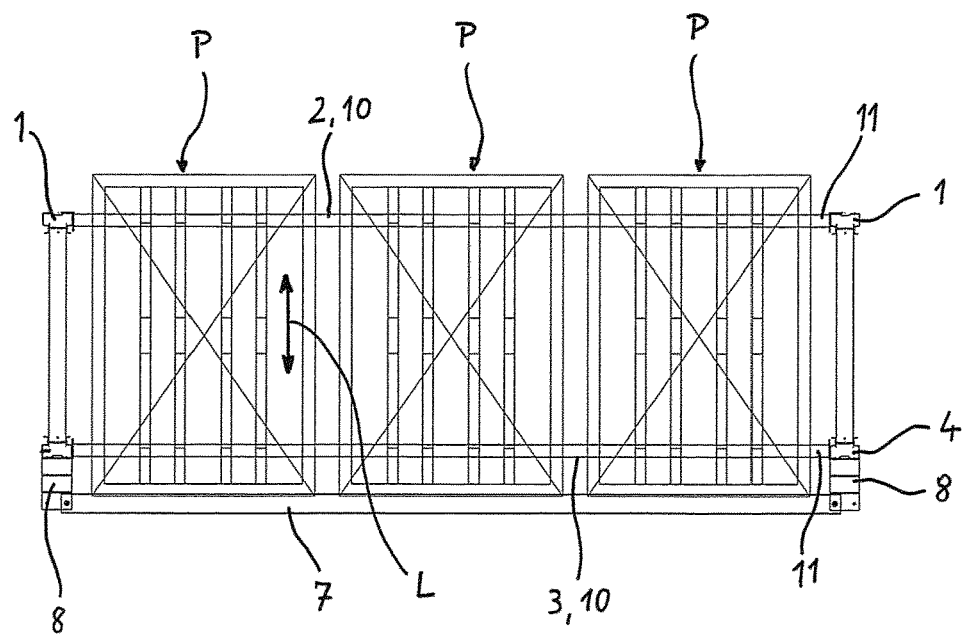
FIG. 1 shows a plan view of one rack level of a storage rack for pallets loaded with goods, wherein three pallets are shown arranged side by side.
Figure 2:
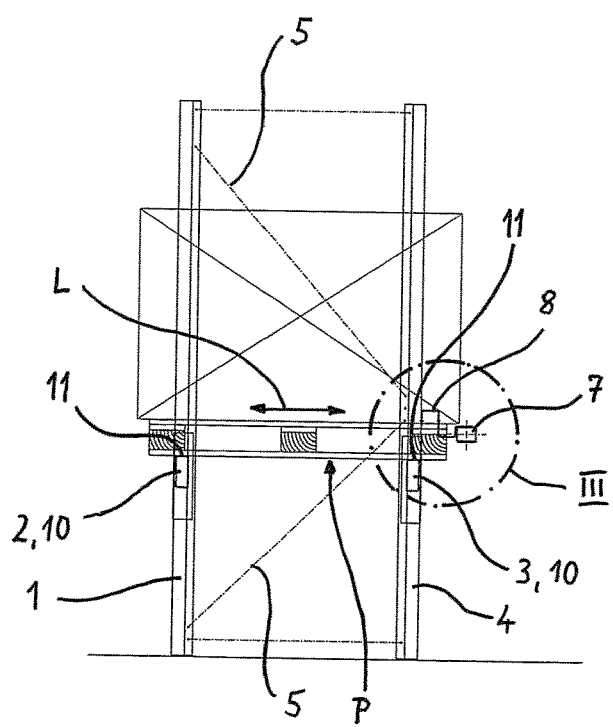
FIG. 2 shows a side view of the rack level of the storage rack.

The storage rack described below is frequently the smallest unit in a large-scale piece goods storage system, such as used for example in mail order and shipping firms. The placement-into-storage and removal-from storage of the generally cuboid-shaped pieced goods takes place from a cross lane by means of fork lift trucks or by using special rack servicing appliances. The storage racks which are preferably arranged on both sides of the cross lane are multi-storeyed and have storage lanes opening towards the cross lane in which the piece goods are stored.

The static foundation structure of the storage racks is formed substantially by vertical front support elements 1, vertical rear support elements 4 as well as horizontally arranged crossbeams 2,3 which each connect two support elements 1 and 4 to one another. Diagonal reinforcement stays 5 can furthermore be provided between the front and rear supports 1 and 4 respectively.

On the front side of the storage rack where for placing the goods or piece goods into storage and removing same from storage there is a cross lane for a fork lift truck which can be moved into position in front of each individual storage place, or for an automatically operating rack servicing appliance, each two vertical support elements 1 are connected horizontally by a front crossbeam 2. Similarly each two support elements 4 at the rear of the storage rack are connected horizontally to one another by a rear crossbeam 3. The support, elements 1, 4 are configured as punched hole profiled elements for connecting the transversely arranged crossbeams 2, 3 with the support elements 1, 4. This enables the transverse crossbeams 2, 3 and other rack elements to be fastened at different heights corresponding to the hole pattern of the punched hole profiled elements. The rear crossbeam 3 is located at the same level as the front crossbeam 2.

The distance measured in the direction of the rack depth between the front crossbeam 2 and the rear crossbeam 3 is less than the length, measured in the direction of the rack depth, of the transport pallets P which rest on the two crossbeams 2,3 together. The two crossbeams 2,3 serve together in this embodiment as front and rear profiled supporting elements 10 whose upper sides each form a support 11 for the piece good or the transport pallet P. The transport pallet P, for example a standard-dimensioned Euro pallet, is supported in the region of its front edge, in the placement-into-storage direction, on the support 11 of the rear profiled supporting element 10, and in the region of its rear edge, in the placement-into-storage direction, on the support 11 of the front profiled supporting element 10.

Further components of the storage racks are stop elements 7 fastened in a shock-absorbing manner. These are arranged at the rear ends of the storage lanes, thus the ends facing away from the cross lane, and are located higher up than the level of the supports 11. The stop elements 7 are profiled elements which are arranged to yield horizontally and extend horizontally transversely to the storage lane and thus transversely to the placement-into-storage and removal-from-storage direction L. The stop elements 7 can be of such a length that they extend transversely equally over two or three adjacent storage lanes. In FIG. 1 one stop element 7 extends equally over three storage lanes.

The stop elements 7 restrict the placement-into-storage path at the back. They themselves however, since they are designed as hollow profiles, are substantially rigid but are fastened on the storage rack so as to yield against shock loads. In this way in cases where a new piece good is placed too forcefully in the direction of the shelf depth there is no permanent damage or deformation to the storage rack and more particularly to the static supporting parts thereof.

For a pliable arrangement of the stop element 7 serving as the rear stop the latter is not fastened directly to the rear supports 4 or rear crossbeam 3, but only indirectly via elements 8 which serve at the same time as connecting and damping elements.

Each of these elements 8 is a brace which is configured to yield in the direction of the rack depth and which is comprised of a shaped sheet metal part and which is attached on one side on the back of the rear support element 4, and on which on the other side the stop element 7 is fastened. In the event of a collision, thus too strong a horizontal force or too strong a shock impulse against the stop element 7, the pliable element 8 is able to stretch whereby forces are dissipated, and the force impulse exerted on the storage rack is damped. Since the stop elements 7 are not rigidly mounted, but are connected to the support elements 4 and/or profiled supporting elements 10 of the storage rack via the elements 8 which are designed deformable and able to yield in the longitudinal direction of the storage lane, this reduces the risk whereby in the cases of the piece goods being placed into storage too forcefully in the direction of the shelf depth, damage could occur to the rack and to the components supporting same, and more particularly lead to deformation and thus weakening of the support elements 1, 4 which are particularly important for the statics of the rack.

The elements 8 are configured and arranged in such a way that they absorb the forces, which could normally lead to damage to the rack, through deformation whereby the elements 8 are stretched. This stretching is not reversible but is of a plastic type. It thus leads to a permanent deformation.

If on the other hand the deformation of the element 8 were to be reversible, thus for example, of the spring-elastic type, then it could result in undesired spring-back effects for the already placed piece goods.

Figure 5:
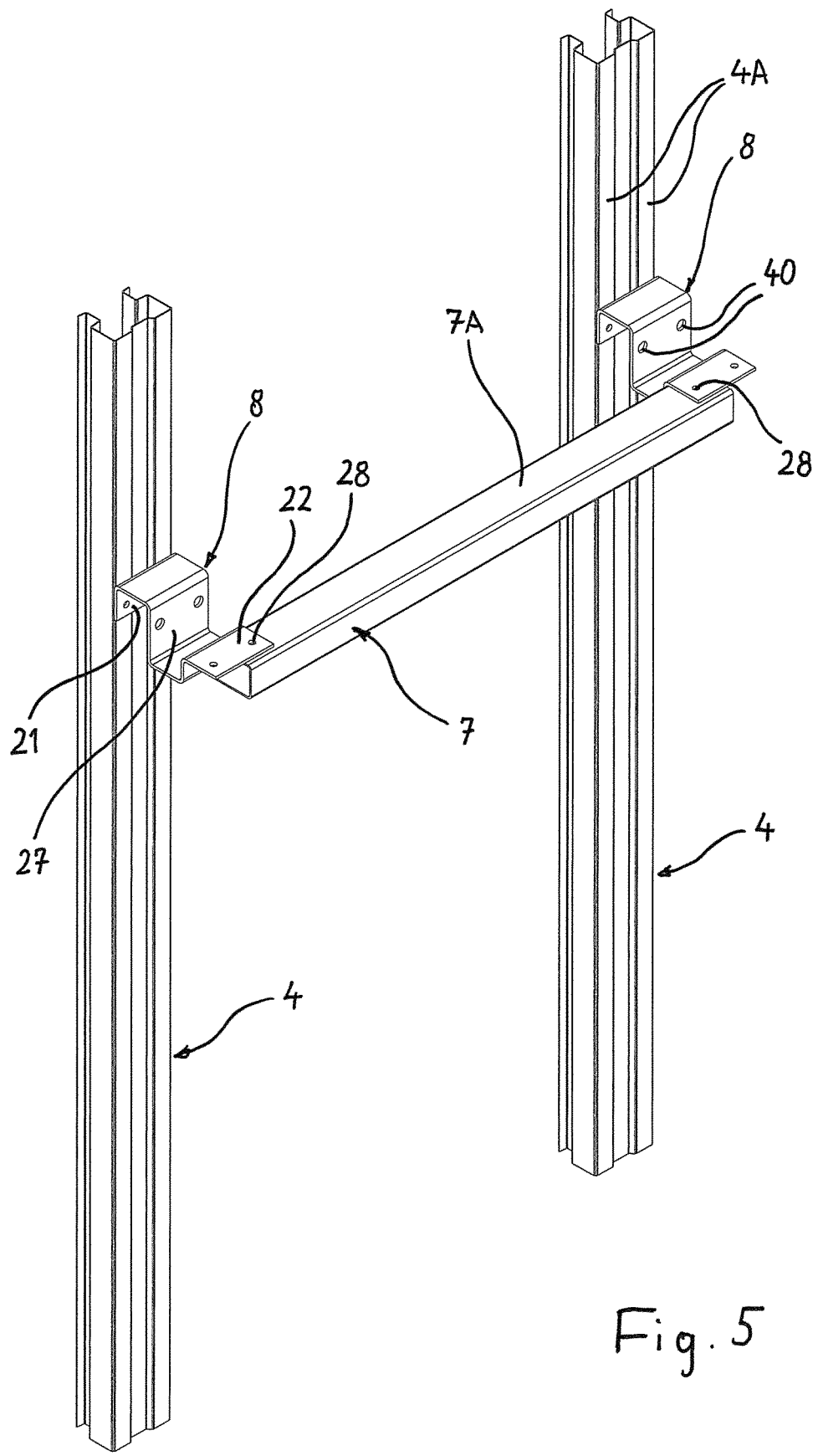
FIG. 5 shows the objects according to FIGS. 4 and 5 in a perspective view inclined from above.

Once an element 8 is deformed it is replaced by a new element 8 which still has full deformability. In order to keep down the costs of this replacement the elements 8 are one-piece shaped sheet metal parts which can be economically manufactured. These consist for example of a one-piece steel plate which through multiple bending and where necessary also stamping, receives the configuration which can be seen more especially in FIG. 3 and FIG. 5. A first fastening region 21 for connecting with the support element 4, a second fastening region 22 for connecting with the stop element 7, configured as a profiled element, and a deformable region 25 between the two fastening regions 21, 22 are all formed as one piece on this shaped sheet metal part.

The connecting element 8 is fastened by the first fastening region 21 against the rear side 4A of the rear support element 4 which is configured as a profiled part, or alternatively against the rear profiled supporting element 10. Fastening is carried out for example by a screw fitting 26 for which the first fastening region 21 has an opening with a horizontal opening axis, which is brought into alignment with the openings in the hole pattern of the support element 4 before a screw 26 or a pin, bolt, rivet etc. is pushed through as the fastening element.

The second fastening region 22 of the connecting element 8 is on the other hand arranged substantially horizontally. It is supported with a flat surface on the upper side 7A and/or the underside of the stop element 7 which is configured here as a square profile. The second fastening region 22 is provided with an opening with a vertical opening axis. A screw 28, a pin, a rivet, a bolt or a comparable fastening element can be pushed through the opening as well as through an opening aligned therewith in the upper side 7A of the stop element 7.

The connecting element 8 is provided with the shock-absorbing deformable region 25 between the two fastening regions 21, 22. This region, seen in side view, is substantially S-shaped formed from a first bending section 31 in the form of a downwardly opening dish or channel, and a following second bending section 32 in the form of an upwardly opening dish or channel. As a result of this configuration of bending sections 31, 32 with opposing bending profiles at least one section 27 extending transversely to the placement-into-storage and removal-from-storage direction L is a constituent part of the deformable region 25. The section 27 is here a vertically extending section of the deformable region 25. The section 27 can however likewise be arranged also inclined to the placement-into-storage and removal-from-storage-direction L. The configuration of the deformable region 25 from bending sections 31, 32 having mutually opposing bending profiles and by forming at least one section 27 running transversely or inclined leads to a pliability which absorbs and dampens shock loads in a favorable manner.

Figure 4:
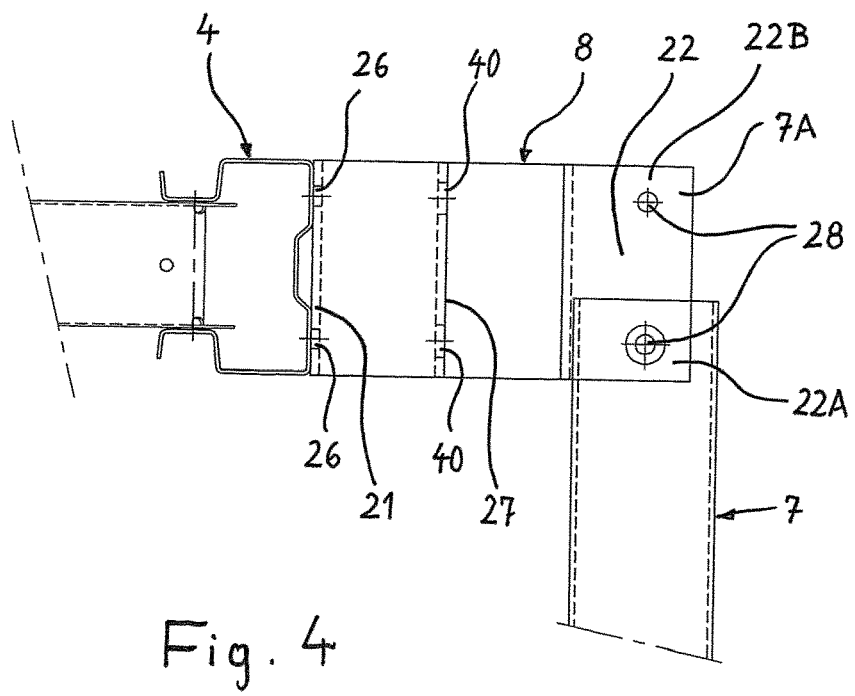
FIG. 4 shows a plan view of the stop element and a connecting element which connects the stop element to the rear side of the storage rack.

According to the plan view of FIG. 4 the second fastening region 22 comprises two fastening zones 22A, 22B which are arranged side by side in the same level. A first stop element 7 is fastened in the first fastening zone 22A, and a second structurally identical stop element can be fastened in the second fastening zone 22B arranged adjacent here. The connection is undertaken as already described by way of screws 28, pins or bolts with a vertical axis. It may happen that a shock on the one stop element 7 then also leads through the then plastically stretching connecting element 8 to an entrainment of the respective other stop element, but without a transfer of the horizontal bending forces from the one stop element to the other stop element, which could lead to damage to the respective other stop element. For this it is advantageous if a spacing A is provided between the two stop elements 7, as indicated in FIG. 6.

To enable easy and rapid replacement of a connecting element 8 the mounting of the first fastening region 21 on the rear side 4A of the support element 4 is carried out by two screws 26 arranged at the same height next to one another. In order to easily reach the screws 26 or pin connections from the outside, the section 27 which runs transversely to the placement-into-storage and removal-from-storage direction L is provided with an assembly opening 40 in the extension of the screw fitting 26 or pin connection. This, equally like the other openings, can be produced by hole-punching the shaped sheet metal part. A screwing tool can be passed horizontally through each assembly opening 40 in order to easily reach the screw fitting 26 arranged behind same.

Figure 3:
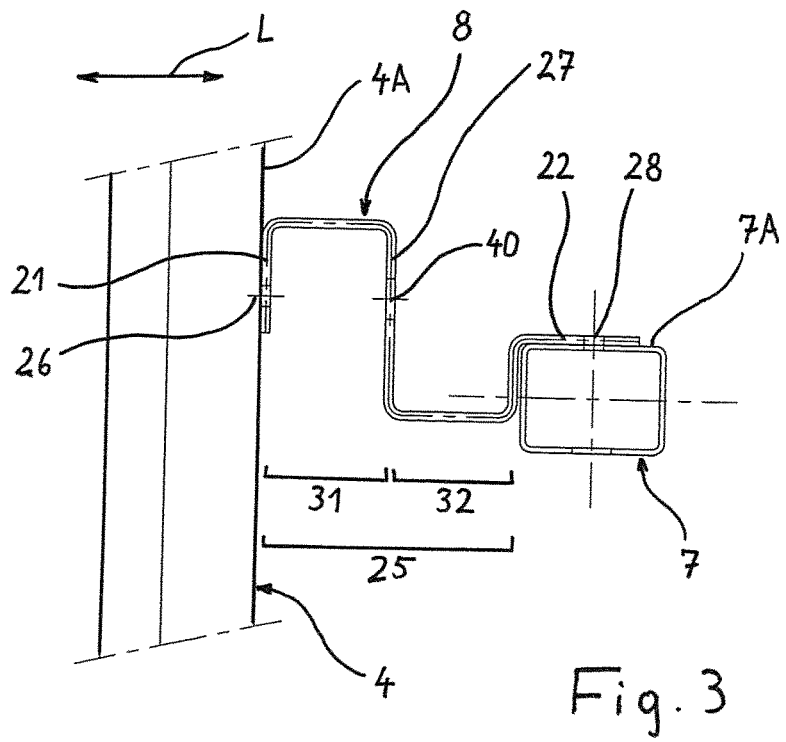
FIG. 3 shows the detail III of FIG. 2, namely a stop element fastened flexibly on the rear side of the storage rack, on an enlarged scale.

The assembly opening 40 is preferably arranged higher up than the second fastening region 22, as can be seen in FIG. 3.

Figure 6:
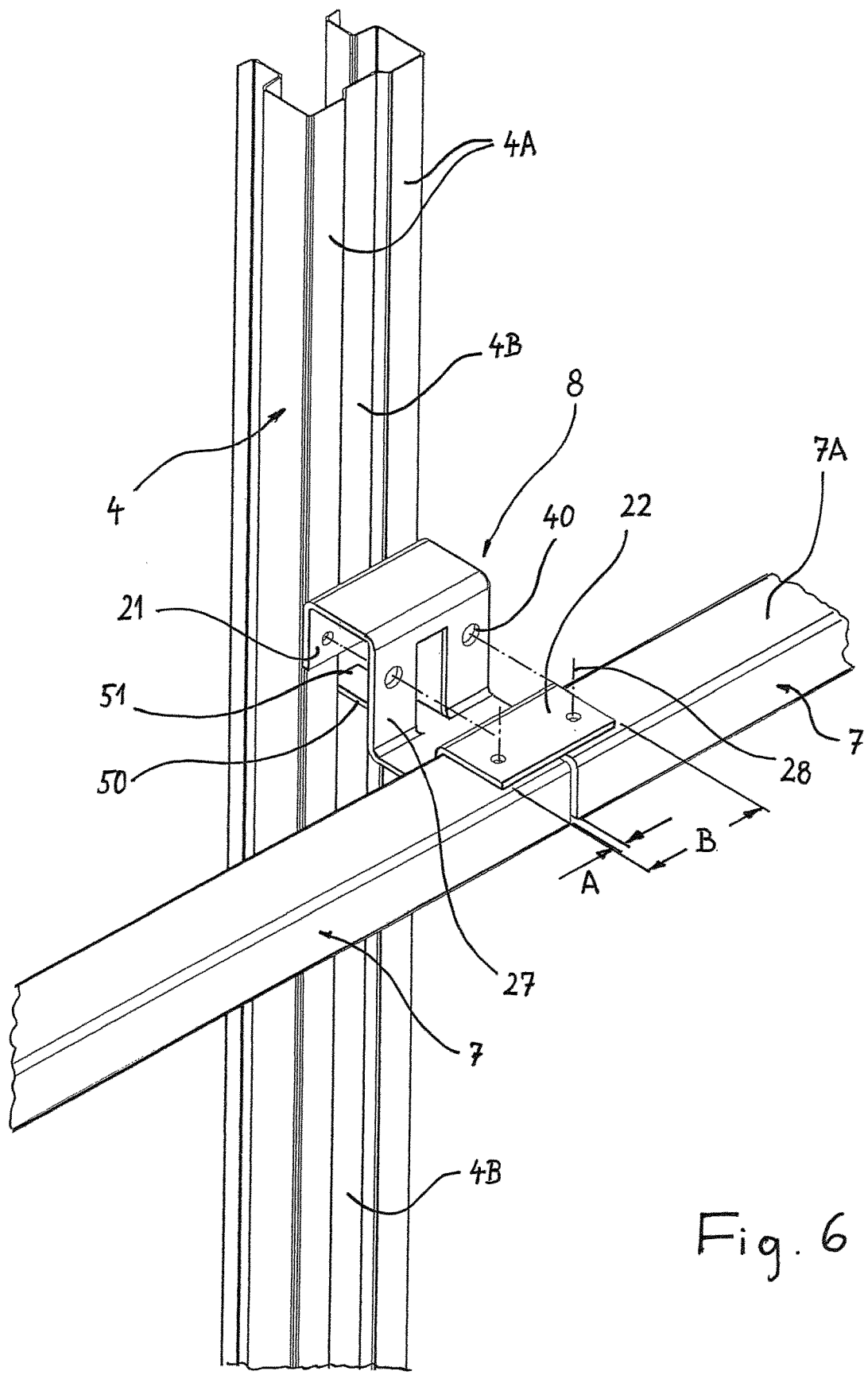
FIG. 6 shows in a second embodiment and in a perspective view inclined from above two stop elements and one connecting element which connects the stop elements to the rear side of a vertical support element of the storage rack.
Figure 7:
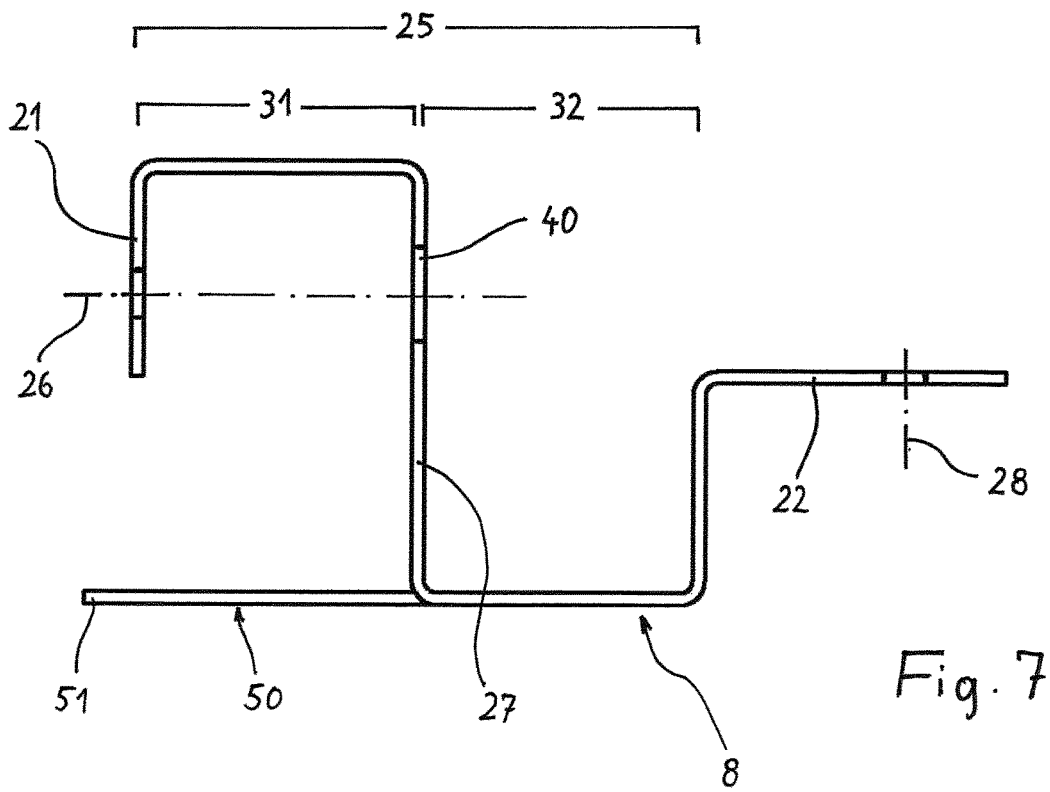
FIG. 7 shows the connecting element according to FIG. 6 in side view.
Figure 8:
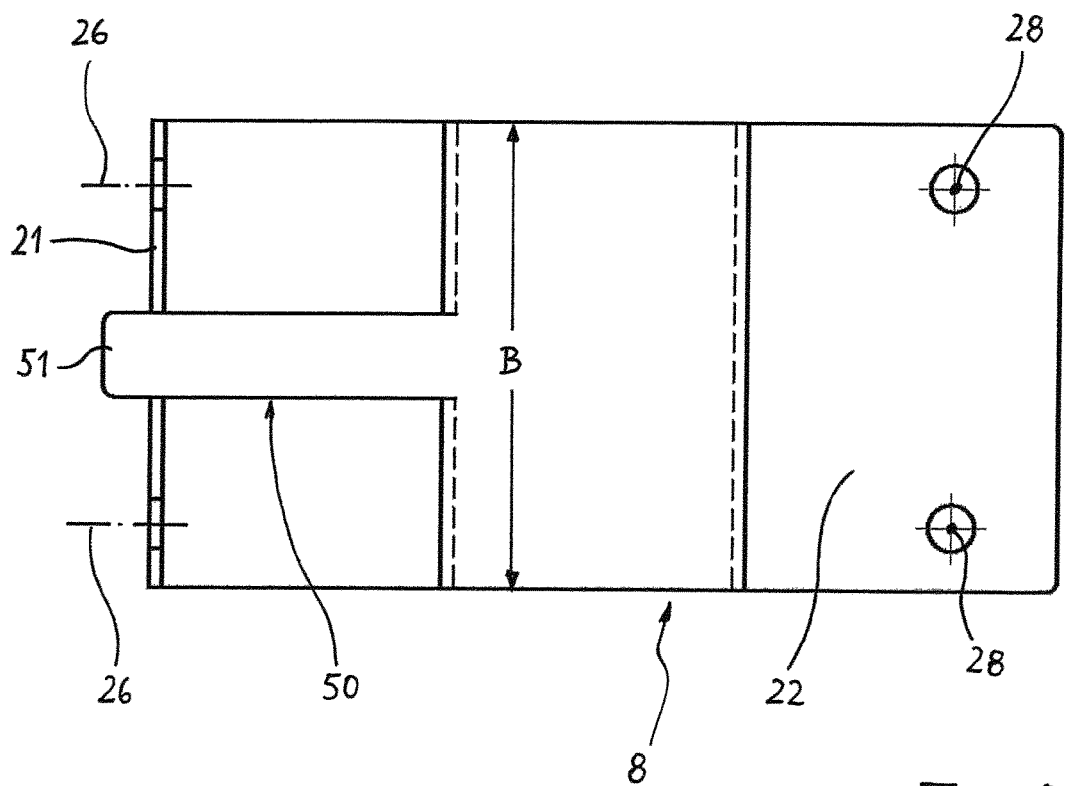
FIG. 8 shows the connecting the element according to FIG. 6 in a view from below.

With the second embodiment according to FIGS. 6-8 the connecting and damping element 8 is provided with a bracket plate 50, through partially stamping out the sheet metal material in the region of the vertical section 27. The bracket plate 50 is located in the middle of the width B of the element 8. The free end 51 of the bracket plate extends towards a vertically arranged surface 4B on the rear support 4. This free end 51 is preferably supported against the vertically arranged surface 4B, without being connected to the surface 4B.

The bracket plate 50 formed on the element 8 provides additional support against the support element 4 whereby the stop elements 7 are prevented from swinging up and down or vibrating.

According to FIG. 6 the rear support element 4 is configured as a profile, and the surface 4B is formed as an indentation or recess in the rear side of the profile extending in the profile longitudinal direction. The support element 4 has on each side of this groove-like indentation 4B surface areas 4A against which the first fastening region 21 of the connecting element 8 is fastened, as already explained above for the embodiment according to FIGS. 1 to 5.

In order to prevent the stop elements from swinging up and down the free end 51 of the bracket plate 50 is located lower down than the fastening region 21. The additional support provided by the bracket plate 50 has no negative effect on the ability of the element 8 to absorb forces, which could normally lead to damage to the rack, since the element 8 undergoes a plastic stretching.

The engagement of the bracket plate 50 in the groove-shaped indentation 4B produces a lateral locking action and prevents the stop elements 7 from swinging to and fro in the horizontal lateral direction.

REFERENCE NUMERAL LIST

1 Front support element
2 Front crossbeam
3 Rear crossbeam
4 Rear support element
4A Rear side
4B Vertically arranged surface, indentation
5 Reinforcement stay
7 Stop element
7A Upper side
8 Connecting element, damping element
10 Profiled supporting element
11 Support, upper side of the support profile
21 First fastening region
22 Second fastening region
22A Fastening zone
22B Fastening zone
25 Deformable region
26 Screw fitting, screw
27 Section
28 Screw fitting, screw
31 Bending section
32 Bending section
40 Assembly opening
50 Bracket plate
51 Free end
A Spacing
B Width
L Longitudinal direction, placement-into-storage and removal-from-storage direction
P Transport pallet

What is claimed is:

1. A storage rack for accommodating cuboid-shaped piece goods, comprising:
    front and rear vertical support elements (1, 4),
    storage lanes extending over the rack depth and having first ends, wherein the first ends define a placement-into-storage and removal-from-storage side of the storage rack, the storage lanes comprising at least two horizontal profiled supporting elements (10) which are arranged parallel to one another for forming supports (11) for the piece goods,
    stop elements (7) disposed at second ends of the storage lanes facing away from the placement-into-storage and removal-from-storage side,
    wherein the stop elements (7) are located at a level above the level of the supports (11),
    wherein the stop elements (7) are fastened on the rear support elements (4) by connecting elements (8) which are deformable in a yielding manner in a longitudinal direction of the storage lanes;
    wherein each connecting element (8) is a shaped sheet metal part comprising, formed integrally in the sheet metal part,
        a first fastening region (21) rigidly connected to the rear support element (4),
        a second fastening region (22) rigidly connected to the stop element (7),
        a deformable region (25) arranged between the first and second fastening regions (21, 22), wherein the deformable region (25) comprises at least one section (27) which extends transversely or inclined to a direction of placement-into-storage and removal-from-storage;
    wherein the deformable region (25) is comprised of a first bending section (31) and a second bending section (32) with mutually opposite bending profiles, wherein the first bending section (31) and the second bending section (32) follow each other in the direction of placement-into-storage and removal-from storage.

2. The storage rack as claimed in claim 1, wherein each stop element (7) is a horizontal profiled element extending transversely to the storage lane.

3. The storage rack as claimed in claim 1, wherein the first fastening region (21) is fastened vertically on the rear support element (4).

4. The storage rack as claimed in claim 1, wherein the second fastening region (22) is arranged substantially horizontally.

5. The storage rack as claimed in claim 4, wherein the second fastening region (22) is fastened on an upper side or an underside of the stop element (7).

6. The storage rack as claimed in claim 1, wherein the first bending section (31) is formed as a downwardly open dish and the second bending section (32) is formed as an upwardly open dish.

7. The storage rack as claimed in claim 1, wherein the connecting element (8) further comprises, formed integrally in the sheet metal part, a bracket plate (50) comprising a free end (51) that is facing a vertically arranged surface (4B) on the rear support element.

8. The storage rack as claimed in claim 7, wherein the free end (51) of the bracket plate (50) is supported against the vertically arranged surface (4B).

9. The storage rack as claimed in claim 7, wherein the free end (51) of the bracket plate (50) is situated at a slight distance opposite the vertically arranged surface (4B).

10. The storage rack as claimed in claim 7, wherein the rear support element (4) is configured as a profile having a rear side facing the stop element (7), wherein the vertically arranged surface is an indentation (4B) extending in a longitudinal direction of the profile in the rear side of the profile, and wherein the profile has on each side of the indentation (4B) flat surface areas (4A) against which the first fastening region (21) of the connecting element (8) is fastened.

11. The storage rack as claimed in claim 7, wherein the free end (51) of the bracket plate (50) is arranged underneath the first fastening region (21).

12. The storage rack as claimed in claim 7, wherein the bracket plate (50) is a stamped-out section of the shaped sheet metal part.

13. A storage rack for accommodating cuboid-shaped piece goods, comprising:
front and rear vertical support elements (1, 4);
storage lanes extending over the rack depth and having first ends, wherein the first ends define a placement-into-storage and removal-from-storage side of the storage rack, the storage lanes comprising at least two horizontal profiled supporting elements (10) which are arranged parallel to one another for forming supports (11) for the piece goods;
stop elements (7) disposed at second ends of the storage lanes facing away from the placement-into-storage and removal-from-storage side;
wherein the stop elements (7) are located at a level above the level of the supports (11);
wherein the stop elements (7) are fastened on the rear support elements (4) by connecting elements (8) which are deformable in a yielding manner in a longitudinal direction of the storage lanes;
wherein each connecting element (8) is a shaped sheet metal part comprising, formed integrally in the sheet metal part,
a first fastening region (21) rigidly connected to the rear support element (4),
a second fastening region (22) rigidly connected to the stop element (7),
a deformable region (25) arranged between the first and second fastening regions (21, 22), wherein the deformable region (25) comprises at least one section (27) which extends transversely or inclined to a direction of placement-into-storage and removal-from-storage;
wherein the first fastening region (21) is fastened vertically on the rear support element (4); and
wherein the first fastening region (21) is fastened to a rear side (4A) of the rear support element (4).

14. A storage rack for accommodating cuboid-shaped piece goods, comprising:
front and rear vertical support elements (1, 4);
storage lanes extending over the rack depth and having first ends, wherein the first ends define a placement-into-storage and removal-from-storage side of the storage rack, the storage lanes comprising at least two horizontal profiled supporting elements (10) which are arranged parallel to one another for forming supports (11) for the piece goods;
stop elements (7) disposed at second ends of the storage lanes facing away from the placement-into-storage and removal-from-storage side;
wherein the stop elements (7) are located at a level above the level of the supports (11);
wherein the stop elements (7) are fastened on the rear support elements (4) by connecting elements (8) which are deformable in a yielding manner in a longitudinal direction of the storage lanes;
wherein each connecting element (8) is a shaped sheet metal part comprising, formed integrally in the sheet metal part,
a first fastening region (21) rigidly connected to the rear support element (4),
a second fastening region (22) rigidly connected to the stop element (7),
a deformable region (25) arranged between the first and second fastening regions (21, 22), wherein the deformable region (25) comprises at least one section (27) which extends transversely or inclined to a direction of placement-into-storage and removal-from-storage;
wherein the second fastening region (22) is arranged substantially horizontally;
wherein the second fastening region (22) is comprised of a first fastening zone and a second fastening zone (22A, 22B) which are arranged horizontally next to one another, wherein the first fastening zone (22A) is screwed or riveted to a first one of the stop elements (7) and the second fastening zone (22B) is screwed or riveted to a second one of the stop elements (7).

15. A storage rack for accommodating cuboid-shaped piece goods, comprising:
front and rear vertical support elements (1, 4);
storage lanes extending over the rack depth and having first ends, wherein the first ends define a placement-into-storage and removal-from-storage side of the storage rack, the storage lanes comprising at least two horizontal profiled supporting elements (10) which are arranged parallel to one another for forming supports (11) for the piece goods;
stop elements (7) disposed at second ends of the storage lanes facing away from the placement-into-storage and removal-from-storage side;
wherein the stop elements (7) are located at a level above the level of the supports (11);
wherein the stop elements (7) are fastened on the rear support elements (4) by connecting elements (8) which are deformable in a yielding manner in a longitudinal direction of the storage lanes;

wherein each connecting element (8) is a shaped sheet metal part comprising, formed integrally in the sheet metal part,
- a first fastening region (21) rigidly connected to the rear support element (4),
- a second fastening region (22) rigidly connected to the stop element (7),
- a deformable region (25) arranged between the first and second fastening regions (21, 22), wherein the deformable region (25) comprises at least one section (27) which extends transversely or inclined to a direction of placement-into-storage and removal-from-storage;

wherein the first fastening region (21) is connected by a screw or rivet connection to the rear support element (4), wherein the at least one section (27) of the deformable region (25) is provided with an assembly opening (40) that is extending in axial alignment with the screw or rivet connection.

* * * * *